(12) United States Patent
Kluge

(10) Patent No.: US 10,417,546 B2
(45) Date of Patent: Sep. 17, 2019

(54) DATA STORAGE MEDIUM WITH TWO-DIMENSIONAL LIGHT SOURCE

(71) Applicant: GIESECKE & DEVRIENT GMBH, München (DE)

(72) Inventor: Stefan Kluge, München (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 15/519,309

(22) PCT Filed: Jun. 2, 2015

(86) PCT No.: PCT/EP2015/001123
§ 371 (c)(1),
(2) Date: Apr. 14, 2017

(87) PCT Pub. No.: WO2016/058649
PCT Pub. Date: Apr. 21, 2016

(65) Prior Publication Data
US 2017/0243099 A1 Aug. 24, 2017

(30) Foreign Application Priority Data
Oct. 16, 2014 (DE) .................. 10 2014 015 275

(51) Int. Cl.
*G06K 19/07* (2006.01)
*G06K 19/077* (2006.01)

(52) U.S. Cl.
CPC ... *G06K 19/0723* (2013.01); *G06K 19/07705* (2013.01); *G06K 19/07773* (2013.01)

(58) Field of Classification Search
CPC .................................. G06K 19/0723

USPC ........................................... 235/492; 362/621
See application file for complete search history.

(56) References Cited

U.S. PATENT DOCUMENTS

| 9,592,701 B2 | 3/2017 | Fischer et al. |
| 9,672,459 B2 | 6/2017 | Pueschner et al. |
| 2008/0093764 A1* | 4/2008 | Ito ........................ B29C 31/044 264/101 |

(Continued)

FOREIGN PATENT DOCUMENTS

| CN | 102105886 A | 6/2011 |
| CN | 202472722 U | 10/2012 |

(Continued)

OTHER PUBLICATIONS

German Search Report for corresponding German Application No. 102014015275.8, dated Dec. 3, 2014.

(Continued)

*Primary Examiner* — Allyson N Trail
(74) *Attorney, Agent, or Firm* — Workman Nydegger

(57) ABSTRACT

A portable data carrier has a contactless interface which serves for transmitting energy and data between the data carrier and an external terminal. A first chip serves for processing the data and is supplied with energy and data by the contactless interface. The data carrier comprises a body which is at least partly light-transmissive at least on one area, wherein the data carrier has a light source which extends areally at least over a part of the area of the data carrier and emits light uniformly or non-uniformly over the areal extension.

20 Claims, 2 Drawing Sheets

(56) References Cited

U.S. PATENT DOCUMENTS

| | | | | |
|---|---|---|---|---|
| 2009/0131146 | A1* | 5/2009 | Arezina | G07F 17/32 463/20 |
| 2011/0277361 | A1* | 11/2011 | Nichol | G02B 6/0018 40/541 |
| 2012/0187199 | A1* | 7/2012 | Poidomani | G06K 19/06206 235/492 |
| 2012/0286936 | A1* | 11/2012 | Mullen | G06Q 10/00 340/10.2 |
| 2013/0155723 | A1* | 6/2013 | Coleman | G02B 6/0018 362/621 |
| 2013/0256529 | A1* | 10/2013 | Boday | C09K 11/025 250/307 |
| 2014/0050903 | A1* | 2/2014 | Lettow | H01B 1/24 428/201 |
| 2014/0284386 | A1* | 9/2014 | Finn | H01Q 1/2225 235/488 |
| 2015/0258835 | A1 | 9/2015 | Fischer et al. | |
| 2016/0004947 | A1 | 1/2016 | Pueschner et al. | |

FOREIGN PATENT DOCUMENTS

| | | |
|---|---|---|
| DE | 102012108170 A1 | 3/2014 |
| DE | 102013102003 A1 | 8/2014 |
| WO | 2009064141 A2 | 5/2009 |
| WO | 2010091518 A1 | 8/2010 |
| WO | 2014131830 A2 | 9/2014 |

OTHER PUBLICATIONS

International Search Report for corresponding International PCT Application No. PCT/EP2015/001123, dated Sep. 7, 2015.
Chinese Office Action from CN Application No. 20150055578.X, dated Mar. 4, 2019.

* cited by examiner

DATA STORAGE MEDIUM WITH TWO-DIMENSIONAL LIGHT SOURCE

BACKGROUND

The invention describes a portable data carrier for a contactless communication with a terminal, the data carrier having an areal light source.

From the prior art there are known light-emitting diodes as spot-type light sources for portable data carriers, such as e.g chip cards, identity cards, credit cards, etc. For obtaining an areal light source on a portable data carrier, there is required a great technical and financial effort for the necessary light guides and optical diffusing disks.

SUMMARY

Starting out from the prior art, it is the object of the invention to find a solution which avoids the described disadvantages.

For achieving the object the invention discloses a portable data carrier comprising
a contactless interface which serves for transmitting energy and data between the data carrier and an external terminal, e.g. a card reading device or a mobile phone with NFC interface,
a first chip which serves for processing the data and is supplied with energy and data by the contactless interface, wherein the data carrier comprises a body which is at least partly light-transmissive at least on one area,
which is characterized by the data carrier having a light source which extends areally at least over a part of the area of the data carrier and emits light uniformly or non-uniformly over the areal extension.

The advantage of the invention is that it is possible to provide an areal light source with a uniform light emission distributed over the area on a portable data carrier, such as e.g. a chip card, credit card, identity card, driving license, SIM card, health insurance card, social security card etc., which in contrast to the spot-type light sources known from the prior art in the form of e.g. light-emitting diodes represents a uniform areal light source, without it being necessary to put in the high effort of e.g. diffusing disks, as it is known in the prior art, to obtain an areal light source on a portable data carrier. The light source and the first chip are supplied with energy e.g. jointly through the contactless interface which preferably is an antenna coil. Alternatively, the light source can also be supplied with energy through an antenna coil of its own. The light source can either be lit controlled by the first chip, or it can be lit independently of a control by the first chip, e.g. by the illumination source being lit as soon as it is supplied with sufficient energy. The data carrier itself preferably consists of laminated foil layers, in general any other suitable construction of the data carrier also being possible.

An advantageous embodiment example is that a cover is disposed above the light source, which has at least one passage for the emitted light of the light source at least one position.

The advantage of the cover is that it is possible to represent individual symbols, signs, shapes, pictures, writings, letters, numbers, etc. on the surface of the data carrier by means of the passages, by the cover being illuminated from behind by the light source and a viewer recognizing the emitted light of the light source at the passages of the cover from the front, and thus e.g. an inscription or a picture can be recognized. The cover can consist e.g. of a metallization into which passages are incorporated in the form of an individual personalization, an inscription, a picture, etc., e.g. by means of a laser. The metallization may extend over the entire surface of the data carrier. Thus, as with printing single cards, individually configured luminous motifs are representable on the data carrier which become visible from outside in particular when illuminated by the light source from the inside of the card, whereby at least a part of the luminous motif may be recognizable already without illumination. Upon illumination the luminous motif or an additional luminous motif becomes clearly visible. Further, the brightness of the illumination may be increased or decreased depending on the case of application such that a luminous motif appears brilliant and striking. The invention can thus also be used for security features on sovereign documents, such as e.g. identity cards, passports, driving licenses, etc.

A further advantageous embodiment example is that the cover is a printing ink, a hologram and/or a Kinegram.

By means of the cover the passage where the emitted light of the light source is visible from outside can be limited. The cover itself may be disposed in the card or on the card, here. Further, a luminance can be lowered in certain positions by a partly light-transmissive print on a passage of the cover.

A further advantageous embodiment example is that the light source is an organic light-emitting diode or an electroluminescent luminous layer. Advantageously, the light source consists of a printable material which clearly simplifies the processing. Alternatively, any other suitable light source is possible.

A further advantageous embodiment example is that the contactless interface is an antenna coil.

A further advantageous embodiment example is that the antenna coil is light-transmissive.

The advantage of a light-transmissive antenna coil is that the antenna coil can also be disposed in a region visible from outside without the antenna coil being recognizable from outside.

A further advantageous embodiment example is that in the body of the data carrier there is disposed at least one light guide to direct light emitted by the light source into regions of the data carrier where no light source is disposed.

Light guides are expedient specifically in edge areas of the data carrier where the light source cannot be disposed by way of construction, but still an edgeless illumination of the entire surface of the data carrier is desired.

A further advantageous embodiment example is that at least two light guides are disposed at an angle to each other.

The light guides can be disposed, for example, parallel to each other or at a right or acute or any other suitable angle.

A further advantageous embodiment example is that at least two light guides are disposed in a common plane or in different planes of the body of the data carrier.

A common plane is expedient, when e.g. two light guides extend parallel to each other. Different planes are expedient, when e.g. two light guides are disposed at an angle to each other.

A further advantageous embodiment example is that at least one light guide is light-transmissive at least on a part of its surface.

When a light guide is light-transmissive at least on a part of its surface, then arbitrary patterns of exiting light can be generated on the surface of the light guide by means of the light guide, i.e. the light can exit the light guide only at a very specific position.

A further advantageous embodiment example is that the body and/or at least one light guide include/s at least one fluorescent dye and/or an optical diffuser.

The advantage of fluorescent dyes and optical diffusers is that optical effects are obtained when these reflect light. The optical diffusers can be e.g. white, matt, silvery or golden reflecting metal or glimmer particles.

A further advantageous embodiment example is that the body has an at least partly structured surface on at least one outer side.

The advantage of the structured surface is that the emitted light of the light source exits preferably at the structured surface. Hence, regions can be specified or manufactured, where light exits preferably. The structured surface can be produced e.g. by means of a lamination plate, a milling or a high embossing.

A further advantageous embodiment example is that a second chip for controlling the light source is disposed on the data carrier.

The advantage of the second chip is a relief of the first chip and the possibility of representing particular optical effects, e.g. a running light.

A further advantageous embodiment example is that the light source is arranged to change the light color.

A device for changing the light color can lead to quite individual light effects and thus cause a clearly increased forgery resistance.

BRIEF DESCRIPTION OF THE DRAWINGS

Embodiment examples of the invention are hereinafter described with reference to the attached Figures.

DETAILED DESCRIPTION OF VARIOUS EMBODIMENTS

Figure 1:
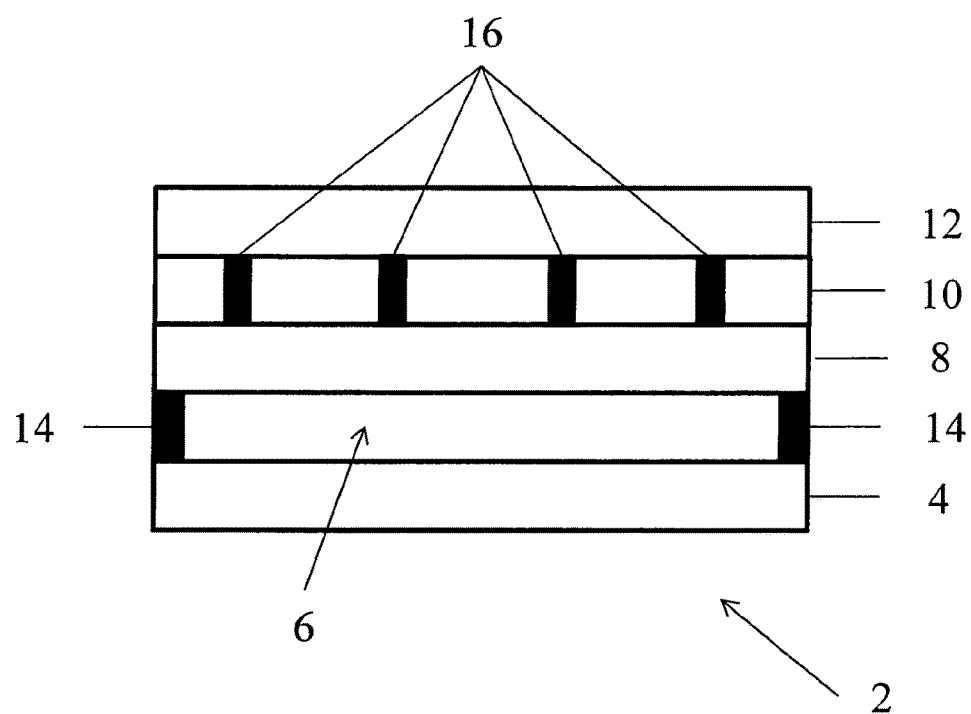
FIG. 1 shows a construction of a data carrier according to the invention.

In FIG. 1 there is shown a structural construction in a side view of a data carrier 2 according to the invention. For reasons of clarity, no representation of the chip, the antenna coil and the electrical connections is made. The data carrier 2 comprises a carrier 4. The carrier 4 may consist of several foil layers. Further, the carrier 4 may be light-transmissive or light-non-transmissive. Depending on the case of application, the carrier 4 is personalizable. On the carrier 4 there is disposed an areal light source 6 according to the invention. The light source 6, due to the manufacturing, may have an edge 14. On the light source 6 there is optionally located a light-transmissive layer 8. An optional cover 10 according to the invention is attached to the layer 8. In the cover 10 there are disposed passages 16 through which the light can be recognized from outside. The passages 16 may have the form of e.g. pictures, figures, numbers, signs, letters, symbols, etc. The cover 10 may be e.g. a vapor-deposited metallization. The passages 16 are introduced into the metallization e.g. by means of a laser. Alternatively, the cover 10 may be printed e.g. by means of a screen printing process in such a way that the passages 16 are produced by the printing process. On the cover 10 there is disposed an optional protection layer 12 which is light-transmissive.

Figure 2:
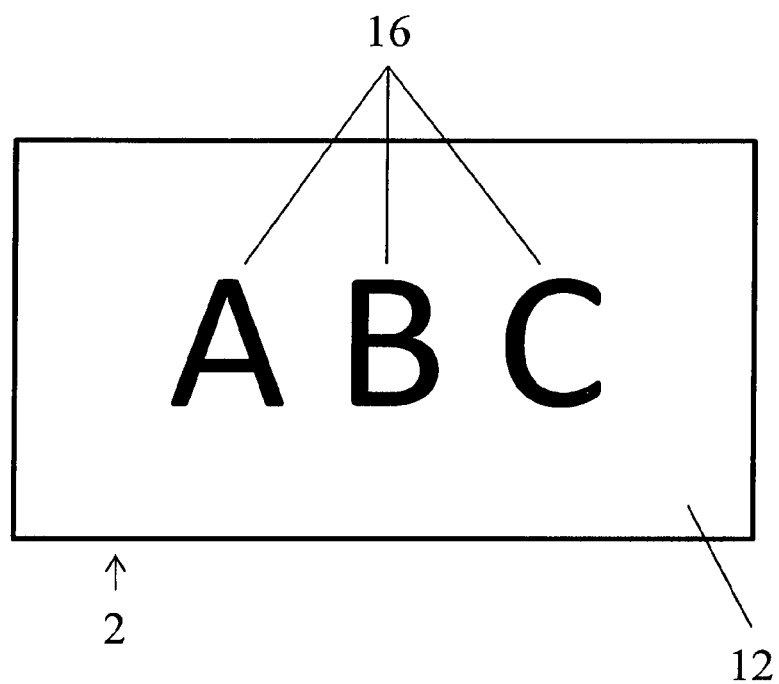
FIG. 2 shows a first exemplary embodiment of the data carrier according to the invention.

FIG. 2 shows a first embodiment example of the data carrier 2 according to the invention in a plan view of the light-transmissive protection layer 12. By the light emitted by the light source 6 the passages 16 in the form of the letters ABC are visible from outside.

LIST OF REFERENCE SIGNS 2 data carrier according to the invention
4 carrier
6 areal light source
8 light-transmissive layer, optional
10 cover
12 protection layer, optional
14 edge outside the areal light source
16 passage in the cover

The invention claimed is:

1. A portable data carrier comprising:
    a contactless interface that transmits data between the data carrier and an external terminal, the contactless interface further configured to receive energy transmitted from the external terminal to the data carrier,
    a first chip that processes the data received from the external terminal, and the first chip being supplied with the energy and the data by the contactless interface,
    a body that includes a light-transmissive layer which is at least partly light-transmissive at least on one area, the body further including a cover that is non-transmissive to light, and
    a light source which extends areally at least over a part of an area of the body of the data carrier and emits light uniformly over the area of the body over which the light source extends, the light source being powered by the energy transmitted to the contactless interface,
    wherein the cover has at least one light-transmissive passage through which the emitted light of the light source passes at at least one position.

2. The data carrier according to claim 1, wherein the cover is a printing ink, a hologram and/or a Kinegram.

3. The data carrier according to claim 1, wherein the light source is an organic light-emitting diode.

4. The data carrier according to claim 1, wherein the contactless interface is an antenna coil.

5. The data carrier according to claim 4, wherein the antenna coil is light-transmissive such that the antenna coil is not recognizable from outside the data carrier.

6. The data carrier according to claim 1, wherein in the body of the data carrier there is disposed at least one light guide to direct light emitted by the light source into regions of the data carrier where no light source is disposed.

7. The data carrier according to claim 1, wherein at least two light guides are disposed at an angle to each other.

8. The data carrier according to claim 1, wherein at least two light guides are disposed in a common plane.

9. The data carrier according to claim 1, wherein at least one light guide is light-transmissive at least on a part of its surface.

10. The data carrier according to claim 1, wherein the body includes at least one fluorescent dye.

11. The data carrier according to claim 1, wherein the body has an at least partly structured surface on at least one outer side.

12. The data carrier according to claim 1, wherein further comprising a second chip for controlling the light source.

13. The data carrier according to claim 1, wherein the light source is arranged to change the light color.

14. The data carrier according to claim 1, wherein the cover includes a metallization layer through which said at least one light-transmissive passage is provided.

15. The data carrier according to claim 14, wherein the metallization layer of the cover is a vapor-deposited metallization layer.

16. The data carrier according to claim 1, wherein the light source is an electroluminescent luminous layer.

17. The data carrier according to claim 1, wherein the cover is a printing ink.

18. The data carrier according to claim 1, wherein at least two light guides are disposed in different planes of the body of the data carrier.

19. The data carrier according to claim 1, wherein the body includes an optical diffuser.

20. The data carrier according to claim 1, wherein in the body of the data carrier there is disposed at least one light guide to direct light emitted by the light source, and wherein the at least one light guide includes at least one fluorescent dye and/or an optical diffuser.

* * * * *